United States Patent [19]

Relyea et al.

[11] Patent Number: 5,706,338
[45] Date of Patent: Jan. 6, 1998

[54] REAL-TIME COMMUNICATIONS FRAUD MONITORING SYSTEM

[75] Inventors: Wayne E. Relyea, Middletown, N.J.; Suzanne E. Ronca, Bethlehem, Pa.

[73] Assignee: AT&T, Middletown, N.J.

[21] Appl. No.: 686,460

[22] Filed: Jul. 25, 1996

Related U.S. Application Data

[63] Continuation of Ser. No. 596,791, Feb. 5, 1996, abandoned, which is a continuation of Ser. No. 40,785, Mar. 31, 1993, abandoned.

[51] Int. Cl.[6] ........................................... H04M 1/66
[52] U.S. Cl. ..................... 379/189; 379/114; 379/145; 379/196
[58] Field of Search ................... 379/91, 188, 189, 379/200, 112, 113, 114, 145, 146, 249, 143, 196

[56] References Cited

U.S. PATENT DOCUMENTS

| | | | |
|---|---|---|---|
| 4,761,808 | 8/1988 | Howard | 379/112 |
| 4,799,255 | 1/1989 | Billinger et al. | 379/189 |
| 4,811,378 | 3/1989 | Else et al. | 379/189 |
| 5,163,086 | 11/1992 | Ahearn et al. | 379/145 |
| 5,223,699 | 6/1993 | Flynn et al. | 379/91 |
| 5,353,335 | 10/1994 | D'Urso et al. | 379/143 |
| 5,357,564 | 10/1994 | Gupta et al. | 379/188 |

OTHER PUBLICATIONS

IBM Technical Disclosure Bulletin, vol. 25, No. 7B Dec. 1982 "Frank Call Deterrent Means" by B.M. Goldman pp. 3670–3671.

Primary Examiner—Ahmad F. Matar
Attorney, Agent, or Firm—Stuart H. Mayer

[57] ABSTRACT

Increased network security is provided by monitoring in real time one or more characteristics or attributes of telephone calls that are placed through the network and notifying the network customer (i.e., the party responsible for paying for the telephone calls), in real time, when the attributes are indicative of abnormal or fraudulent network usage. The network customer, once notified of the abnormal usage, is in a position to take steps to minimize unauthorized network usage. For example, the network customer can selectively block network usage, deny access to the network on a call-by-call basis, or trace the call to catch the unauthorized user while the call is still in progress.

22 Claims, 4 Drawing Sheets

REAL-TIME COMMUNICATIONS FRAUD MONITORING SYSTEM

This is a continuation of application Ser. No. 08/596,791, filed on Feb. 5, 1996, which is a continuation of application Ser. No. 08/040,785, filed on Mar. 31, 1993 (both are now abandoned).

TECHNICAL FIELD

This invention relates to systems for monitoring usage on a telecommunications network and, more particularly, to systems for monitoring network usage in real time.

BACKGROUND OF THE INVENTION

There are currently many situations in which telecommunications networks are used by individuals without authorization. This unauthorized use places a large financial burden on the entity which owns the network or pays for use of the network. Certain telecommunications networks, such as those networks which allow access to network facilities through the use of an authorization code or toll-free telephone number ("800 number"), are particularly susceptible to such unauthorized use. A Software Defined Network (SDN) is one example of such a telecommunications network. A SDN is a network in which shared transmission and switching facilities are configured under software control through the use of a database to provide a network customer with the capabilities of a private network. Those SDNs having the "remote access" capability allow access to the software-defined private network facilities from off-network locations. Remote access is useful, for example, for allowing a businessperson traveling outside company premises to gain access to the company's private network. Though useful and convenient, this remote access capability may present a security risk to the network customer (hereafter referred to as "the subscriber") who is responsible for paying for network usage. In particular, the same authorization code that gives the businessperson access to the network can be used by unauthorized users to gain access to the network.

Current methods for detecting and preventing unauthorized use of a communications network have not adequately addressed the problem. For example, systems which detect fraud based on data obtained at the end of the billing cycle do not provide sufficiently timely information. By the time the information becomes available to the owner of the private network, large amounts of fraudulent usage could already have occurred. Other methods for dealing with the problem of unauthorized use involve automatically denying or blocking access to the network when abnormal use is detected. Systems which use this technique may annoy valid users of the network whose authorized calls are blocked inadvertently. Also, systems which automatically deny access encourage "hackers" seeking access to the network to try other authorization codes or points of entry to the network. Such systems do not provide a means for catching unauthorized users.

SUMMARY OF THE INVENTION

Increased network security is provided in accordance with the invention by monitoring in real time one or more characteristics or attributes of telephone calls that are placed through the network and notifying the subscriber, in real time, when the attributes are indicative of abnormal or fraudulent network usage. The subscriber, once notified of the abnormal usage, is in a position to take steps to minimize unauthorized network usage. For example, the subscriber can selectively block network usage, deny access to the network on a call-by-call basis, or trace the call to catch the unauthorized user while the call is still in progress.

In an exemplary embodiment of the invention, thresholds indicative of abnormal network usage are established by subscribers. Calls placed in the network chargeable to a subscriber are monitored on an ongoing basis. In particular, selected attributes of a call in-progress are obtained or derived from data provided in real time from the billing record for the call. The attributes of the call are processed to determine whether those attributes exceed one or more of the established thresholds set by the subscriber. If a threshold is exceeded, the subscriber is immediately notified so that the subscriber can authorize and direct preventive action with respect to the call or otherwise modify access to the subscriber's network. Alternatively, some pre-authorized action, such as blocking subsequent calls, can be taken automatically and without notifying the subscriber when a threshold is exceeded.

DETAILED DESCRIPTION

Figure 1:
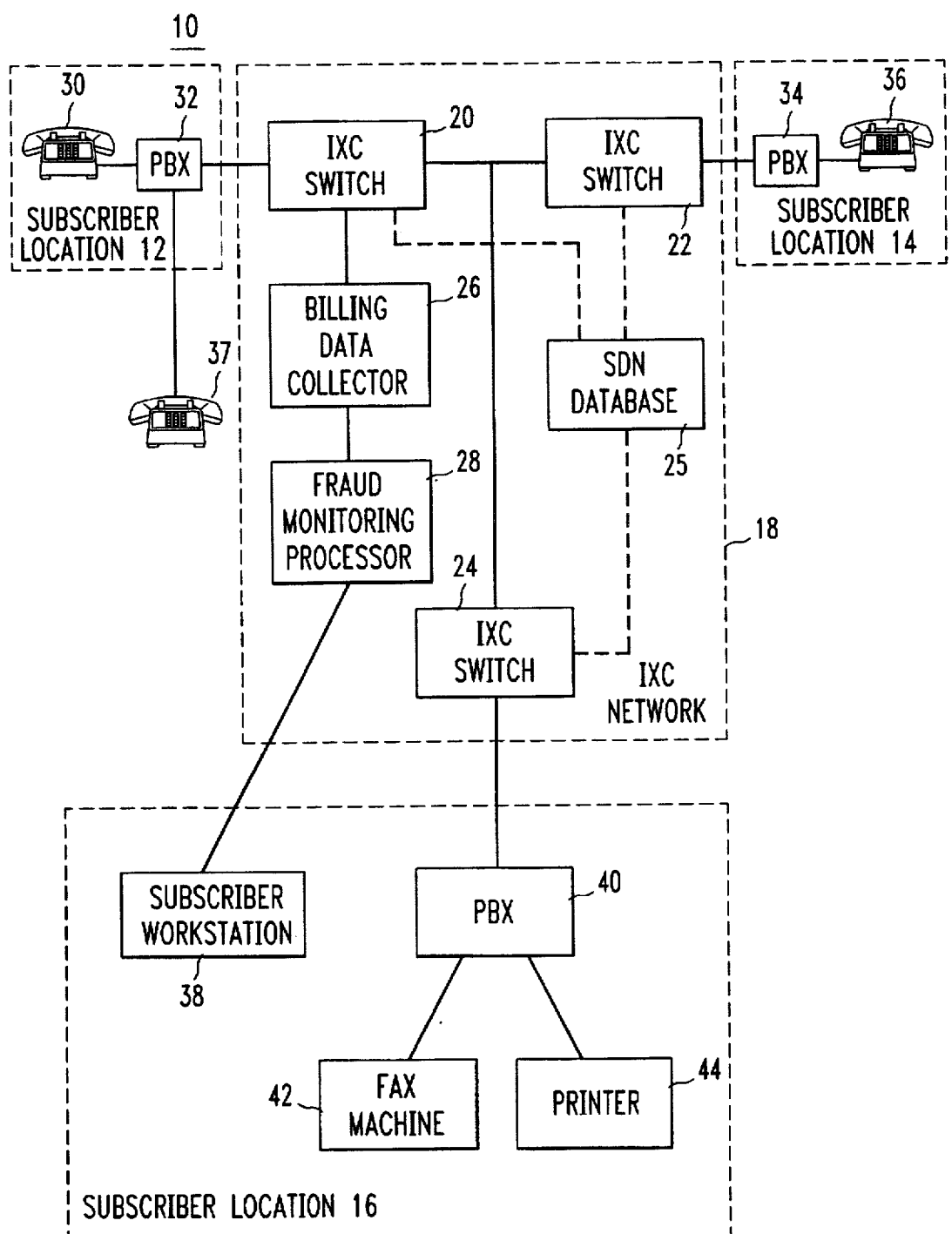
FIG. 1 is a simplified block diagram of an illustrative embodiment of a communication network which includes a network usage monitoring system constructed in accordance with the principles of the invention.

Referring now to the drawings, FIG. 1 shows a communications network 10 which illustratively is an SDN configured for a subscriber. Communications network 10 includes three different customer premises which belong to the subscriber, namely, subscriber locations 12, 14, and 16. Subscriber locations 12, 14, and 16 are interconnected through an interexchange (IXC) network 18. IXC network 18 includes IXC switches 20, 22, and 24, a database 25 for implementing the SDN, a processing means 26 for collecting billing (referred to hereafter as "billing data collector 26"), and a processing means 28 for analyzing aspects of the billing data to detect abnormal network usage (hereafter referred to as "fraud monitoring processor 28").

The principles of the invention will be illustrated by describing the process by which the attributes of a telephone call, placed by a calling party at subscriber location 12 to a called party at subscriber location 14, are monitored to detect abnormal usage of network 10. In this example, a call placed from a telephone station 30 at subscriber location 12 is extended through a private branch exchange (PBX) 32 and routed through IXC switches 20 and 22 of IXC network 18 to subscriber location 14. At subscriber location 14, the call passes via a PBX 34 to the called party at telephone station 36. Remote access to network 10 is provided to callers outside of the network, for example, at a telephone station 37, via PBX 32. Remote access also could be provided for telephone station 37, via IXC switch 20, directly into the SDN.

Billing data collector 26 collects from IXC switch 20 data that will be used for purpose of billing the call placed from telephone station 30. Billing data collector 26 receives the data from IXC switch 20 and generates a call detail record which contains all or some portion of the data received from IXC switch 20. A different call detail record is generated for each and every billed call. Billing data collector 26 generates the call detail record in real time. As used herein, a record is said to be generated in "real time" if the record is generated either soon after the call has terminated or while the call is in-progress. (A call is said to be "terminated" when the connection between the calling and called parties is broken.) Billing data collector 26 can be any suitable or convenient processing means which collects information about a call in real time. One suitable embodiment of billing data collector 26 is described in commonly-owned, U.S. Pat. No. 5,506,893, issued Apr. 9, 1996 entitled "Telecommunication Network Arrangement For Providing Real Time Access To Call Records," which is hereby incorporated by reference. A single billing data collector 26 may be configured to collect data from IXC switches 20, 22, and 24.

In accordance with the invention, fraud monitoring processor 28 is provided to receive call detail records, in real time, from billing data collector 26. Fraud monitoring processor 28 can be embodied as a resident application on billing data collector 26 or, in the alternative, as a separate processor downstream from billing data collector 26 (or several billing data collectors). Fraud monitoring processor 28 uses the call attributes that are stored in a call detail record as described below to derive various indices (e.g., average call duration for calls made using a selected authorization code). Fraud monitoring processor 28 then compares the call attributes and/or derived indices with preselected thresholds which the subscriber (perhaps with the assistance of the telephone service provider) has previously selected or established as being indicative of abnormal network usage. The thresholds are established by the subscriber in view of the subscriber's particular needs or preferences.

When the attributes of a call being analyzed indicate that the call represents an abnormal use or potentially unauthorized use of the network (for example, an attribute exceeds a specified threshold), fraud monitoring processor 28 communicates with subscriber premises 16 to alert the subscriber of the abnormal use. Fraud monitoring processor 28 identifies to the subscriber premises that the call is abnormal by communicating directly with a subscriber workstation 38. Alternatively, fraud monitoring processor 28 communicates through IXC network 18 via interexchange switches 20 and 24, and through a PBX 40 at subscriber premises 16. PBX 40 then communicates with customer premise equipment, such as a fax machine 42 or a printer 44, to give the subscriber notice in real time of the abnormal use. Alternatively, the subscriber could be notified of abnormal use by a telephone call. The subscriber can selectively block network usage, deny access to the network on a call-by-call basis, trace the call to catch the unauthorized user while the call is still in progress, or take other appropriate action, such as by notifying the telephone service provider or modifying the SDN database.

In another preferred embodiment, the telephone service provider, such as the interexchange carrier, automatically takes some pre-authorized action in response to a threshold being exceeded. For example, the subscriber may pre-authorize the telephone service provider to interrupt calls in-progress when it is determined (in real time) that a threshold indicative of abnormal network usage has been exceeded. Such pre-authorized action can be taken automatically, without notifying or contemporaneously with notifying the subscriber that a threshold has been exceeded.

Once a call detail record for a call has been processed and it is determined that none of the predetermined thresholds have been exceeded, fraud monitoring processor 28 will preferably discard its copy of the call detail record. Discarding records in this manner minimizes the storage capacity required within fraud monitoring processor 28. While the actual data contained in the record are not necessarily retained, selected indices that are affected by or calculated from the data are maintained. For example, information such as the average call duration, the number of calls placed under each authorization code, or other such information is maintained as a "running total."

As mentioned above, a call detail record is generated either during a call or after the call has terminated. A call detail record that is generated after the call is terminated typically contains more information than a record that is generated while a call is in progress. For example, in the former case, the call detail record may include information specifying the total duration of the call, while in the latter case, such information is unavailable. Nevertheless, records formed while a call is in-progress can be analyzed and the information utilized while the caller is still on the line. Such information can be advantageously used, for example, in fraud detection and tracing, by allowing detection of simultaneous calls using the same authorization code or cellular automatic number identifier (ANI).

Figure 2:
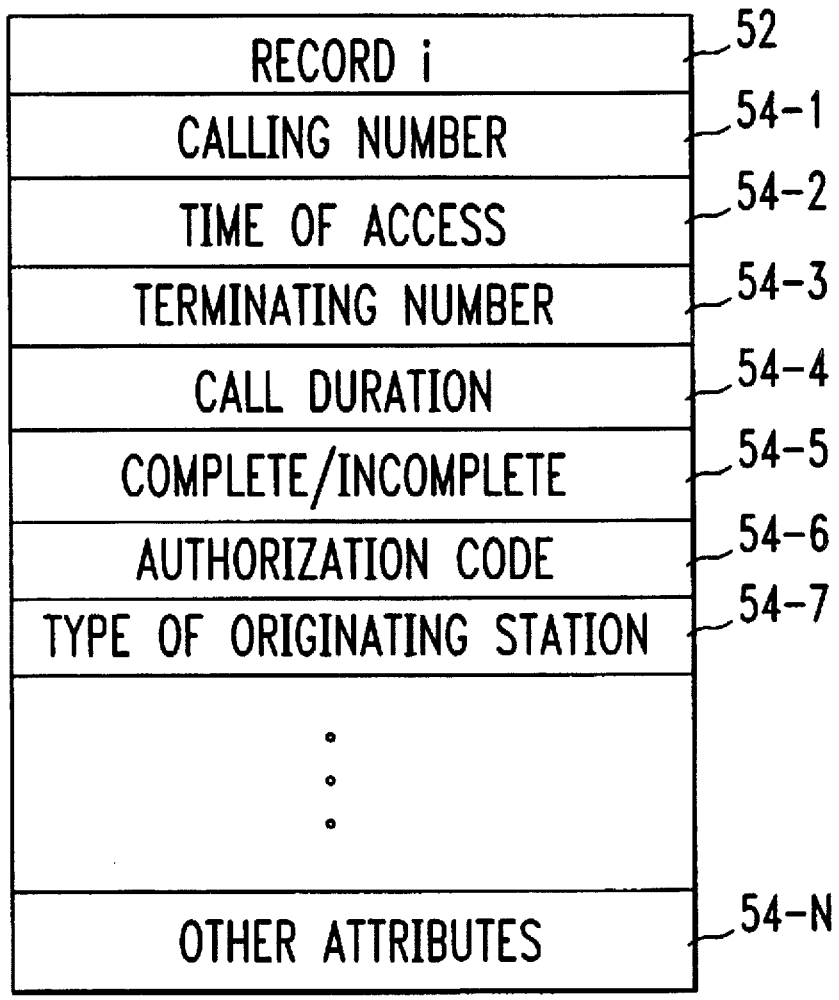
FIG. 2 is a block diagram of the format of a typical record stored in the fraud monitoring processor of FIG. 1.

FIG. 2 shows the structure of an exemplary call detail record 50 received by fraud monitoring processor 28. Call detail record 50 includes one or more key data fields 52 (the contents of which are shown in the drawing as "Record i"), which uniquely identify the record. Attribute data in each record are designated 54-1 through 54-N, where N indicates the number of different attributes or characteristics of the call which the record describes. In the context of long distance calling, these attributes may include the calling number (54-1), the time of access (54-2), the terminating (called) number (54-3), the call duration (54-4), an indication of whether the call was complete or incomplete (54-5), the authorization code or 800 number used to gain access to the network (54-6), the type of originating station (e.g., a pay phone, ordinary telephone, cellular telephone, etc.) (54-7), or other attributes (54-N) which identify the call and may be useful in determining whether the call represents an abnormal use of the communication network for the subscriber.

The network usage monitoring capabilities of the invention are applicable to several different types of communications networks. For example, all calls made from a subscriber's premises can be monitored to detect abnormal usage. Alternatively, monitoring can be limited to situations in which access to restricted network facilities is granted, for example, on the basis of an authorization code provided by the calling party, the calling party's cellular telephone number, or by dialing an 800 number.

Figure 3:
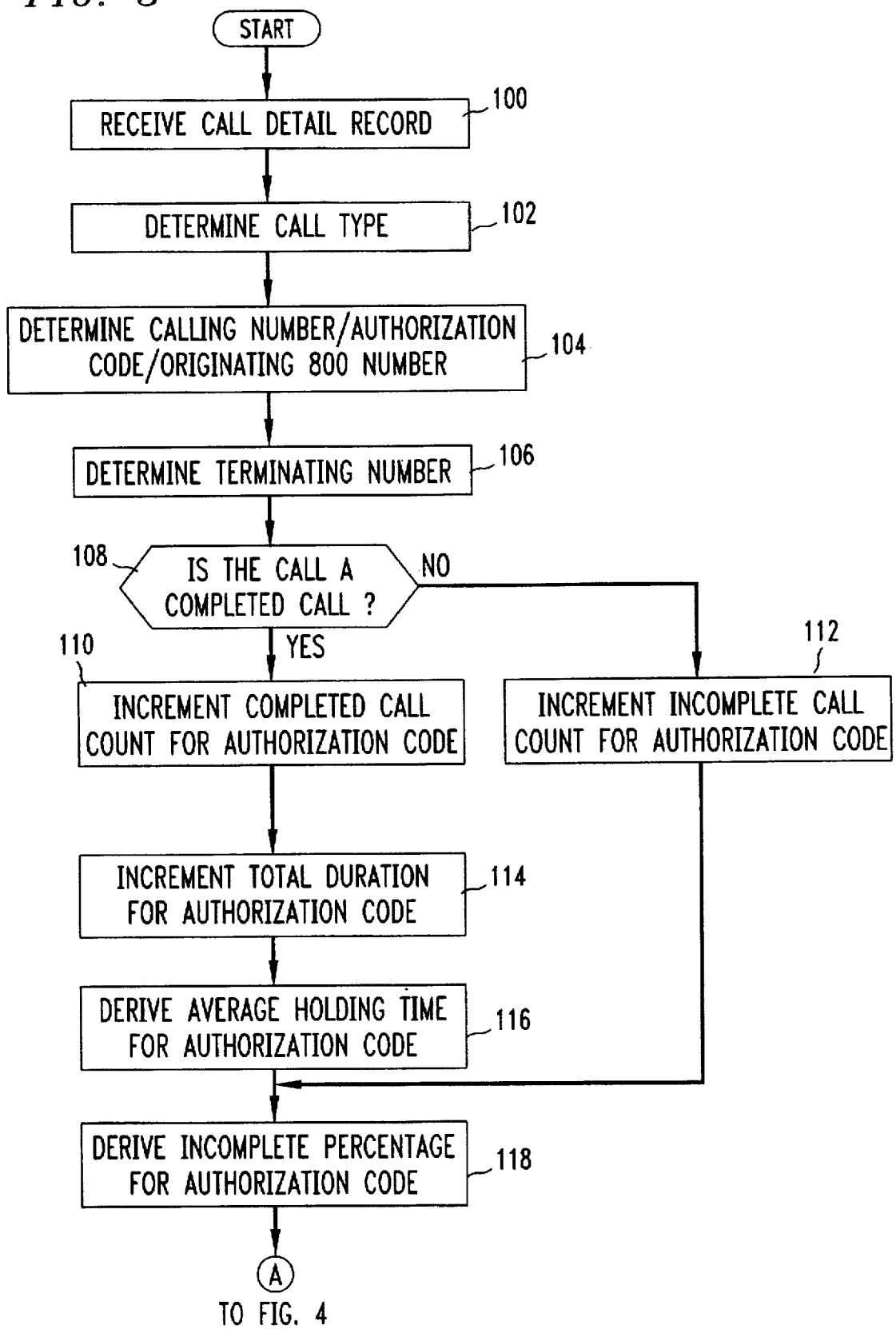
FIGS. 3 and 4 are flow charts of an exemplary process for determining in real time whether the attributes of a call indicate abnormal network usage.
Figure 4:
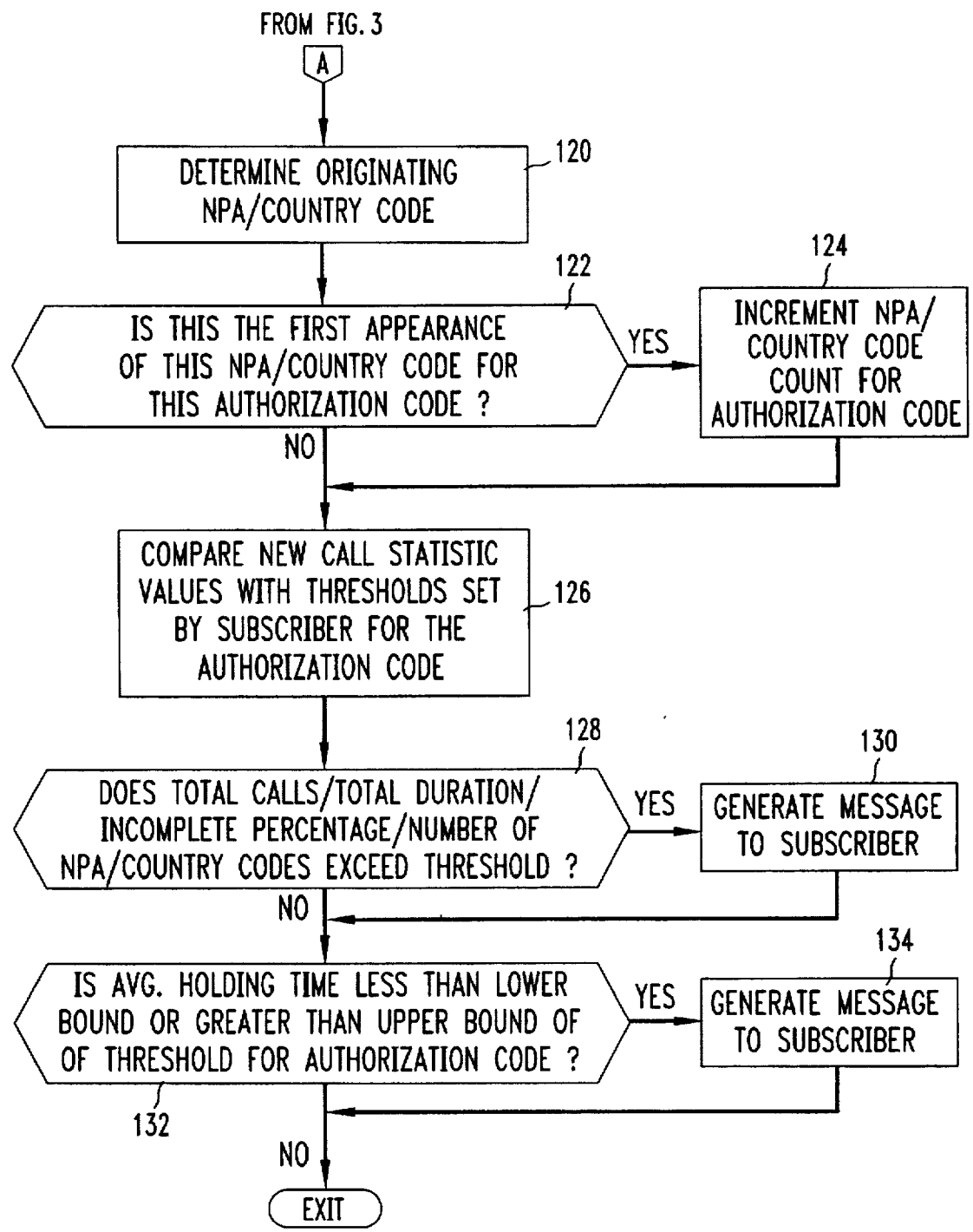

FIGS. 3 and 4 show flow charts of an exemplary method for monitoring network usage in real time to detect abnormal usage. The process begins on FIG. 3 at step 100, where a real time call detail record, such as the call detail record of FIG. 2, is received by fraud monitoring processor 28. Fraud monitoring processor 28 first determines the call type from the attributes in the call detail record (step 102). For example, the call detail record indicates whether the call is an SDN cellular call, an SDN or remote network access call (e.g., from an off-network location such as telephone station 37 of FIG. 1) requiring an authorization code, or a remote network access call through an 800 number access.

Once the call type is identified, fraud monitoring processor 28 determines from the call detail record the calling number, authorization code, or originating 800 number as appropriate for the call type (step 104). For the purpose of this illustration and the remainder of FIGS. 3 and 4, it will be assumed that the call was placed using an authorization code, and that fraud monitoring processor 28 has obtained that authorization code from the call detail record. Fraud monitoring processor 28 then determines from the call detail record the terminating number (or terminating NPA/country code) of the call (step 106).

At this point in the process, fraud monitoring processor 28 begins to analyze the call attributes. For example, the processor determines, in step 108, whether the call is a complete call, that is, whether the call has been answered. If the call has been completed, fraud monitoring processor 28 increments a counter which maintains a count of completed calls for the particular authorization code under which the call was placed (step 110). If the call is incomplete, that is, the call is unanswered by the called party, fraud monitoring processor 28 increments a counter which maintains a count of incomplete calls for the authorization code under which the call was placed (step 112). Fraud monitoring processor 28 also derives for the authorization code the percentage of incomplete calls (step 118). The incomplete call percentage is calculated using information held by counters and obtained in steps 110 and 112.

Assuming the call detail record was generated after termination of a call, the call detail record will include the call duration (also referred to herein as the "holding time"). In this case, fraud monitoring processor 28 will increment a counter which maintains a record of the total call duration, i.e., the total usage, for the authorization code under which the call was initiated (step 114). Fraud monitoring processor 28 also will derive the average holding time for calls placed using the authorization code (step 116).

Referring now to FIG. 4, fraud monitoring processor 28 then determines, from information contained in the call detail record, the originating NPA or country code of the call (step 120). The processor determines whether this is the first appearance of this NPA or country code for this authorization code (step 122). If it is the first appearance, the processor increments a counter (step 124) that tracks the percentage of different NPAs and country codes from which calls have been made using the authorization code. If instead it is the second or later appearance of an NPA/country code, processing continues to step 126.

Having obtained or derived the various statistical values for a call, fraud monitoring processor 28 compares the statistical values with thresholds previously established by the subscriber for the authorization code (step 126). Abnormal network usage is indicated if any of the statistical values exceed one or more of the predetermined thresholds. As shown in step 128, for example, if the total number of calls, total number of minutes of call duration, the number of incomplete calls, or the number of different NPAs/country codes exceed the predetermined thresholds established by the subscriber for that authorization code, the subscriber is notified of the abnormal network usage (step 130). Similarly, as shown in step 132, fraud monitoring processor 28 can determine whether the average holding time is above or below the bounds of the threshold for average holding time for the particular authorization code. If so, the subscriber is notified (step 134).

It is to be understood that although various indices and calculations have been described above as being calculated for a given authorization code, the indices could alternatively be calculated based on the calling number (e.g., calculate average holding time for calls placed from a particular calling number), the 800 number used to gain access to the network, or the subscriber's calls as a whole. Similarly, the thresholds set by the subscriber to indicate abnormal network usage can be specified individually for each authorization code, calling number, or 800 number used to access the network, or can be specified by the subscriber in a more universal manner. It also is within the scope of the invention to derive and maintain separate indices and thresholds for calls placed to selected terminating locations. As used herein, "terminating locations" includes, for example, terminating numbers, terminating NPAs and terminating country codes.

Of course, one skilled in the art will appreciate that criteria other than those described in FIGS. 3 and 4 could be used to determine whether there is abnormal network usage without departing from the scope or spirit of the invention. For example, fraud monitoring processor 28 could be configured to notify the subscriber in real time whenever a call is placed to a country code that is on a list of prohibited country codes.

In accordance with another feature of the invention, each of the statistical values and counted values described above can be cleared or reset after a predetermined period of time as selected by the subscriber. This enables the subscriber to monitor the network usage for a particular calling number or access code on any convenient basis. For example, the calls made under a selected access code can be monitored on a daily basis if a 24-hour period would provide useful information to the subscriber. Alternatively, the calls made under that access code could be monitored on an hourly, weekly, or monthly basis.

It will be understood that the foregoing is merely illustrative of the principles of the invention, and that various modifications can be made by those skilled in the art without departing from the scope and spirit of the invention.

We claim:

1. A method of monitoring a telephone call from a calling communication station to a called communication station through a communications network to detect abnormal usage of the communications network, the method comprising the steps of:

collecting in real time a plurality of predetermined attributes of the telephone call;

retrieving from a database predetermined criteria, the predetermined criteria representing abnormal usage of the communications network;

comparing the plurality of predetermined attributes collected for the telephone call to the retrieved predetermined criteria to determine in real time whether the telephone call represents abnormal usage of the communications network;

generating in real time an indication of abnormal usage of the communications network when the plurality of predetermined attributes satisfy the predetermined criteria; and delivering in real time the indication of abnormal usage to a network customer responsible for paying for usage of the communications network.

2. The invention as described in claim 1 wherein the plurality of predetermined attributes are collected while the call is in-progress.

3. The invention as described in claim 1 wherein the generating step is performed while the call is in progress.

4. The invention as described in claim 1 wherein the predetermined criteria are thresholds indicative of possible unauthorized use of the communications network.

5. The invention as described in claim 4 wherein the thresholds are indicative of abnormal usage for calls originating from a predetermined originating telephone number.

6. The invention as described in claim 4 wherein the thresholds are indicative of abnormal usage for calls placed using a predetermined authorization code.

7. The invention as described in claim 4 wherein the thresholds are indicative of abnormal usage for calls placed using a predetermined 800 number.

8. The invention as described in claim 4 wherein the thresholds are indicative of abnormal usage for calls placed to a predetermined termination location.

9. The invention as described in claim 1 further comprising the steps of:

processing at least one of the predetermined attributes to derive at least one derived attribute;

retrieving from the database additional predetermined criteria, the additional predetermined criteria representing abnormal usage of the communications network;

comparing the at least one derived attribute with the additional predetermined criteria; and generating a second indication of abnormal use of the communications network when the derived attribute satisfies the additional predetermined criteria.

10. The invention as described in claim 1 further comprising the step of tracing the telephone call when the plurality of predetermined attributes satisfy the predetermined criteria.

11. The invention as described in claim 1 further comprising the step of modifying, in real time, access to the communications network when the plurality of predetermined attributes satisfy the predetermined criteria.

12. The invention as described in claim 11 wherein the modifying step comprises terminating the telephone call.

13. The invention as described in claim 11 wherein the modifying step comprises automatically blocking completion of a subsequent telephone call.

14. A method of monitoring a telephone call from a calling communication station to a called communication station through a communications network to detect abnormal usage of the communications network, the method comprising the steps of:

collecting in real time a plurality of predetermined attributes of the telephone call;

retrieving from a database predetermined criteria, the predetermined criteria representing abnormal usage of the communications network;

comparing the plurality of predetermined attributes collected for the telephone call to the retrieved predetermined criteria to determine, in real time, whether the telephone call represents abnormal usage of the communications network;

modifying, in real time, access to the network in accordance with action previously authorized by a network customer responsible for paying for usage of the communications network when the comparison of plurality of predetermined attributes and the predetermined criteria indicates abnormal usage of the communications network is occurring; and notifying the network customer of abnormal usage of the communications network.

15. The invention as described in claim 14 wherein the plurality of predetermined attributes are collected while the call is in-progress.

16. The invention as described in claim 14 wherein the predetermined criteria are thresholds indicative of possible unauthorized use of the communications network.

17. The invention as described in claim 14 wherein the predetermined criteria are indicative of abnormal usage for calls originating from a predetermined originating telephone number.

18. The invention as described in claim 14 wherein the predetermined criteria are indicative of abnormal usage for calls placed using a predetermined authorization code.

19. The invention as described in claim 14 wherein the predetermined criteria are indicative of abnormal usage for calls placed using a predetermined 800 number.

20. The invention as described in claim 14 wherein the predetermined criteria are indicative of abnormal usage for calls placed to a predetermined termination location.

21. The invention as described in claim 14 further comprising the steps of:

processing at least one of the predetermined attributes to derive at least one derived attribute;

retrieving from the database additional predetermined criteria, the additional predetermined criteria representing abnormal usage of the communications network;

comparing the at least one derived attribute with the additional predetermined criteria; and generating an indication of abnormal use of the communications network when the derived attribute satisfies the additional predetermined criteria.

22. A method for monitoring a communications network to detect abnormal usage of the communications network, the method comprising the steps of:

receiving in real time a call detail record for a telephone call placed through the communications network, the call detail record including a plurality of attributes of the telephone call and an authorization code for obtaining access to the communications network;

determining the authorization code for the telephone call from the call detail record;

searching a database of authorization codes and predetermined criteria associated with each of the authorization codes, using the authorization code for the telephone call, to determine if predetermined criteria are associated with the authorization code for the telephone call;

comparing the plurality of attributes of the call detail record for the telephone call with the predetermined criteria associated with the authorization code for the telephone call;

generating, in real time, an indication of abnormal usage of the communications network for the authorization code when the plurality of attributes of the call detail record for the telephone call satisfy the predetermined criteria for the authorization code; and notifying a network customer responsible for paying for usage of the communications network of abnormal usage of the communications network.

* * * * *